United States Patent [19]
Tsuboi

[11] Patent Number: 4,811,041
[45] Date of Patent: Mar. 7, 1989

[54] MAGNIFICATION CHANGE-OVER DEVICE FOR CAMERA

[75] Inventor: Takayuki Tsuboi, Kanagawa, Japan

[73] Assignee: Canon Kabushiki Kaisha, Tokyo, Japan

[21] Appl. No.: 183,374

[22] Filed: Apr. 11, 1988

Related U.S. Application Data

[63] Continuation of Ser. No. 897,310, Aug. 15, 1986, abandoned.

[30] Foreign Application Priority Data

Aug. 20, 1985 [JP] Japan ............... 60-182651
Aug. 20, 1985 [JP] Japan ............... 60-182652

[51] Int. Cl.$^4$ .............................. G03B 1/18
[52] U.S. Cl. .............................. 354/195.12
[58] Field of Search .......... 354/195.12, 150, 152, 354/288

[56] References Cited

U.S. PATENT DOCUMENTS

| | | | |
|---|---|---|---|
| 1,795,626 | 3/1931 | Watkins | 354/195.12 |
| 3,608,456 | 9/1971 | Hauser | 354/150 X |
| 3,887,930 | 6/1975 | Bresson | 354/195.12 X |
| 4,114,171 | 9/1978 | Altman | 354/152 |
| 4,352,546 | 10/1982 | Iwata et al. | 354/150 X |
| 4,527,874 | 7/1985 | Ohmura | 354/195.12 X |
| 4,549,800 | 10/1985 | Maeda | 354/288 X |

OTHER PUBLICATIONS

Handbook of the Leica-System, Jul. 1982, p. 139, Focomat V35 Autofocus.

Primary Examiner—Donald A. Griffin
Attorney, Agent, or Firm—Toren, McGeady & Associates

[57] ABSTRACT

A magnification change-over device for a camera having a common incident optical path for having rays of light from an object impinge thereinto, a first optical path for guiding the rays of light from the object, impinging into the common incident optical path, to a first aperture, a second optical path for guiding the rays of light from the object, impinging into the common incident optical path, to a second aperture, a change-over device for selecting either the first aperture or the second aperture, and a wide converter for rendering magnification of an image formed at the second aperture different from a magnification of an image formed at the first aperture.

30 Claims, 5 Drawing Sheets

MAGNIFICATION CHANGE-OVER DEVICE FOR CAMERA

This is a continuation of application Ser. No. 897,310 filed Aug. 15, 1986 and now abandoned.

BACKGROUND OF THE INVENTION

1. Field of the Invention the present invention relates to a magnification change-over device for a camera, and more particularly to a magnification change-over device for camera which allows a variable power camera to be provided having a small size and a lower cost.

2. Description of the Related Art

A number of different kinds of variable power cameras (cameras with variable magnification) which can make a long focus photographing and a short focus photographing, have been proposed to date. However, conventional variable power cameras have such drawbacks that a zooming mechanism and a lens change over mechanism are located around a lens barrel. Thus, the size and bulk of the camera becomes larger. Also since the lens barrel portion moves largely back and forth along with a magnification changing operation, a mechanism for light shielding becomes complicated resulting in a very high cost.

Contrary to this, the present invention has proposed a magnification change-over device for a camera which provides a small size variable power camera at a low cost wherein the above-mentioned drawbacks are eliminated, and has filed U.S. patent application Ser. No. 866,328 filed May 22, 1986, now pending therefor. An arrangement of the camera of this application is as shown in FIGS. 6(a) and 6(b).

Figure 6A:
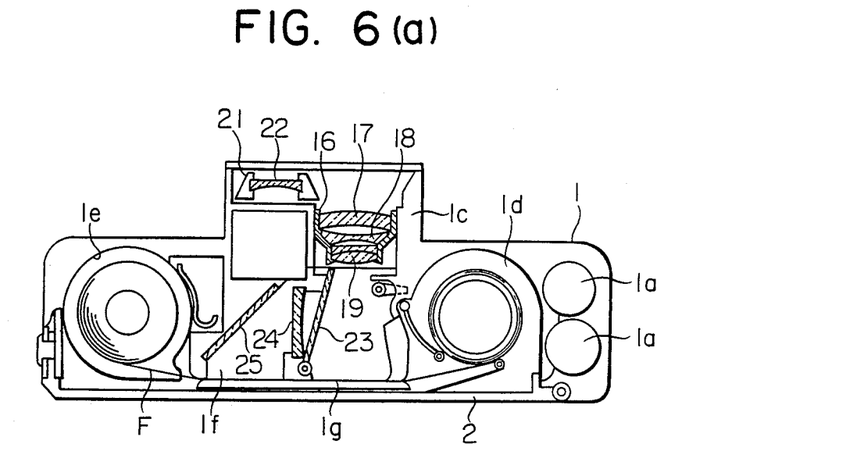
FIGS. 6(a) and 6(b) are general arrangement drawings of a camera to explain a conventional example, wherein FIG. 6(a) show a short focus photographing state
Figure 6B:
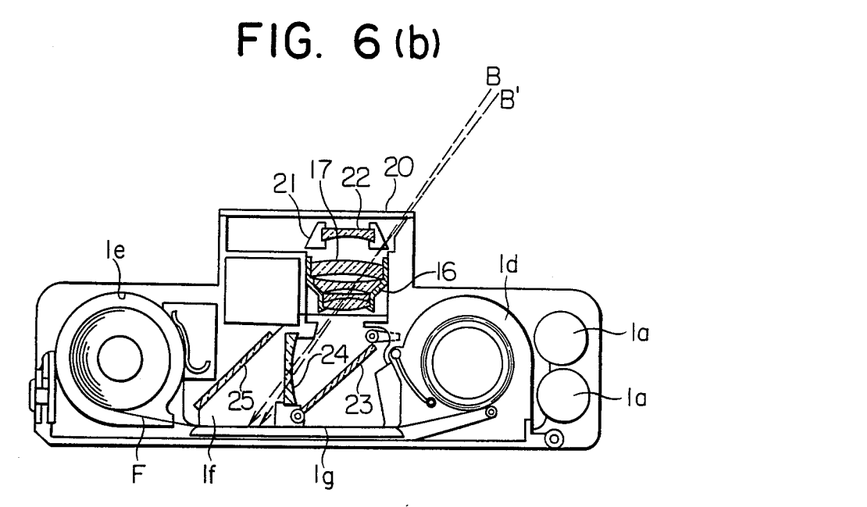

FIG. 6(a) shows the state of each portion of a camera at the time of a short focus photographing, while FIG. 6(b) shows the state when a long focus photographing is made. What is shown as 1 is a camera body, and 2 is a back lid. Within the camera body 1, a battery chamber 1d and a spool chamber 1d, a film cartridge chamber 1e are formed, and, at the same time, an aperture 1f for long focus photographing and an aperture 1g for short focus photographing are provided along a running direction of a film F in a manner adjacent to each other. A photographic lens with a convex lens system comprising lenses 17 to 19, is supported by a lens frame 16, which is fixed within a lens barrel 1c of the camera body 1. A front lens 22, which can move within the lens barrel 1c in the lateral direction, is provided in front of the photographic lens, the front lens 22 being fixed to a movable frame 21. What is shown as 23 is a movable mirror used when a long focus photographing is done, and 24 is a converter lens used when a long focus photographing is made, while 25 is a fixed mirror used also when a long focus photographing is made.

When a short focus photographing is made, the movable mirror 23 and the front lens 22 are placed in the state shown in FIG. 6(a), and the bundle of light from an object passes through the lenses 17 to 19 and is imaged on the aperture 1g for a short focus photographing. On the other hand, when a long focus photographing is made, the movable mirror 23 and the front lens 22 are places in the state shown in FIG. 6(b), and the bundle of light from an object proceeds through a Z shape optical path formed by the front lens 22, the lenses 17 to 19, the movable mirror 23, the converter lens 24, the fixed mirror 25, and the aperture 1f for a short focus photographing, and is imaged at the aperture 1f.

According to such arrangement, a zooming mechanism and a lens change-over mechanism are not located around a lens barrel as in a conventional variable power camera, thus a camera can be made to have a small bulk and size. Further a lens barrel part will not move largely back and forth along with a magnification changing operation, thus a drawback of complicating the mechanism and increasing a cost, and is characterized will be eliminated.

SUMMARY OF THE INVENTION

The present invention is to provide a partial modification for the above-mentioned magnification change-over device for a camera which has been proposed already by the present inventor, and is to make a magnification change-over device for a camera which has a small bulk and size as well as a light weight and has a good portable characteristics yet can be made at a low cost by an incident optical path for having rays of light from an object impinge thereinto, a first aperture for guiding the rays of light from an object impinging into the incident optical path to a first optical path, a second optical path for guiding the rays of light impinging into the incident optical path to a second aperture, change-over means for selecting either the first aperture or the second aperture, and a wide converter for rendering a magnification of an image formed at the second aperture different from a magnification of an image formed at the first aperture.

Other objects of the present invention will become apparent from the following embodiment thereof.

BRIEF DESCRIPTION OF THE DRAWINGS

FIGS. 1(a) and 1(b) are general arrangement illustrations showing an embodiment of the present invention. FIG. 1(a) shows a short focus photographing state and FIG. 1(b) shows a long focus photographing state.

FIGS. 2(a) and 2(b), as well as FIGS. 3(a) and 3(b), show the general outline of important parts of the camera shown in FIGS. 1(a) and 1(b), wherein FIG. 2(a) and FIG. 3(a) show a short focus photographing state, while FIG. 2(b) and FIG. 3(b) show a long focus photographing state.

FIG 6(b) shows a long focus photographing state.

DETAILED DESCRIPTION OF THE PREFERRED EMBODIMENT

Now, an embodiment of the present invention shall be explained by referring to FIG. 1(a) to FIG. 5.

FIG. 1(a) and FIG. 2(a), as well as FIG. 3(a), show general outlines of the state when a variable power camera according to the present invention is in a short focus photographing state. FIG. 1(b), FIG. 2(b) and FIG. 3(b) show general outlines of the state when a variable power camera according to the present invention is in a long focus photographing state.

In FIGS. 1(a) and 1(b), what is shown as 101 is a camera body, this camera body 101, having a film cartridge chamber 101a, a spool chamber 101b, a movable mirror housing opening 101c, a short focus photographing aperture 101d, a long focus photographing aperture 101e, and a light shielding part 101f for shielding a noneffective portion of a bundle of light projecting onto the long focus photographing aperture 101e, formed therein. What is shown as 102 is a spool for taking up the film housed within the spool chamber 101b, and what is shown as 103 is a roller plate for an automatic loading, made to pressure contact with an outer circumference of the spool 102, while what are shown as 104 and 105 are batteries, then 106 is a camera cover which includes a back lid. At a front end portion of the camera cover 106, an opening 106a for a photographing is perforatedly provided. What is shown as 107 is a capacitor for a stroboscopic device and 108 is a fixed member which constitutes an element of a long focus photographing optical path.

A movable mirror 109, which is fitted into the movable mirror opening 101c of the camera body 101, is fixed to a frame body part 124A which constitutes one portion of a V-shaped movable frame 124 rotating around a shaft 124a (refer to FIG. 4 also), this movable mirror 109 being inserted into the movable mirror opening 101c of the camera body 101 when a short focus photographing is made (FIG. 1(a)).

Figure 1:
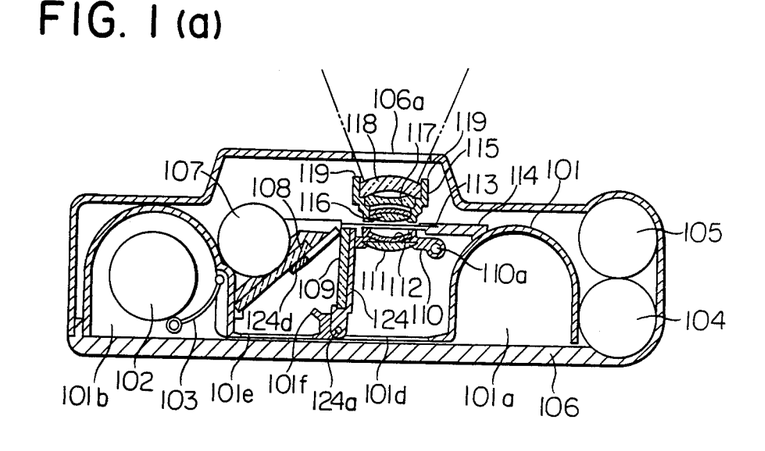
Figure 2:
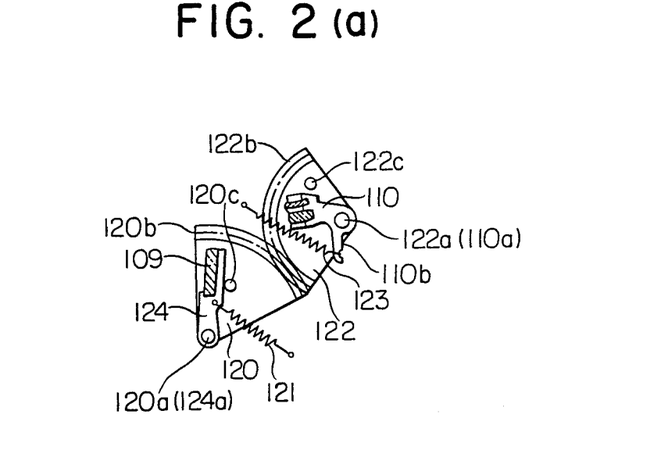
Figure 3:
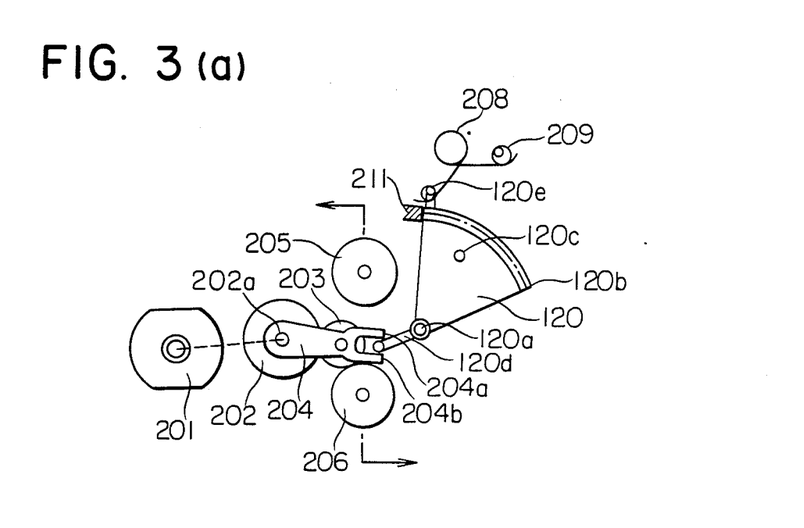
Figure 4:
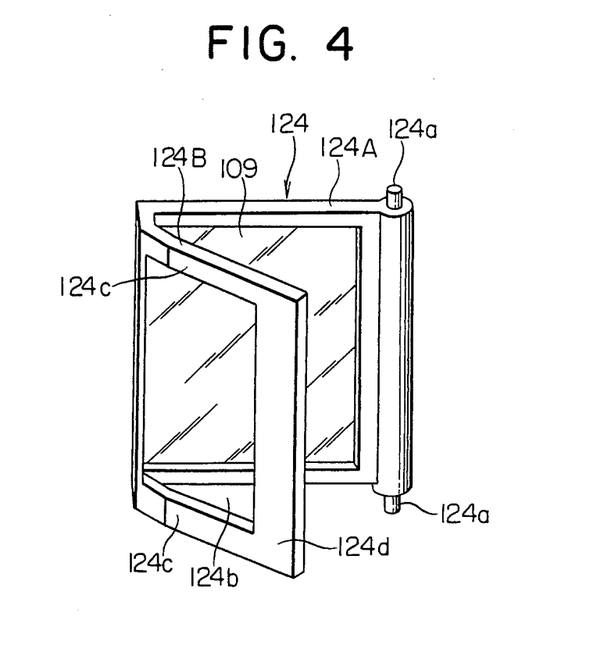
FIG. 4 is an oblique view of a movable mirror in a camera shown in FIG. 1.

The movable frame 124 is, as clearly shown in FIG. 4, made by integrating two frame body parts 124A and 124B positioned as forming a letter V to each other, and the movable mirror 109 is insertedly fitted into an opening of the frame body part 124A, at which the shaft 124a is provided, and, on the other hand, an opening 124b of the other frame body part 124B is left open as a light penetrating opening. A frame member 124d, which is positioned at a force end of the frame body part 124B and extends in a vertical direction (being parallel to the shaft 124a), has a larger width than that of a frame member 124c, which extends to a lateral direction (being perpendicular to the shaft 124a) of the frame body part 124B. This frame member 124d is used as a light shielding member for shielding a non-effective portion of a bundle of light from the aperture 101e for long focus photographing when a long focus photographing is made. This frame member 124d (that is light shielding member) has its thickness so varied as becoming thinner towards the fore end of the frame body part 124B. Also, the opening 124b constitutes a light penetration window to let the penetrating light from the photographic lens (bundle of light reflected from an object) pass therethrough towards the movable mirror 109 when a long focus photographing is made, as will be explained later.

A photographic lens, consisting of Tessar type lenses 116 to 118, is positioned in such manner as facing the opening 106a of the camera cover 106, this photographic lens being fixed within a lens barrel 115. The photographic lens is a long focus lens and is used singularly when a long focus photographing is made. The lens barrel 115 is coupled to an automatic focusing mechanism, which is not shown, so that it can move back and forth in the camera.

Figure 5:
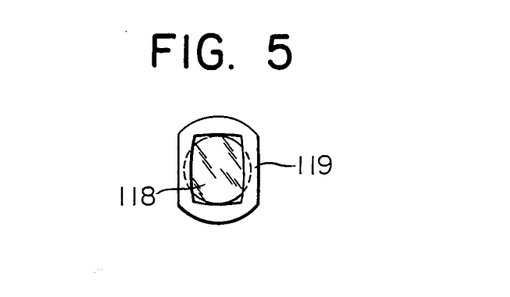
FIG. 5 is a front elevation of a light shielding mask in a camera shown in FIG. 1.

At the fore end plane of the lens barrel 115, a light shielding mask 119, with such framed shape as shielding both side edges of the lens 118, is attached as shown in FIG. 5.

A shutter 113, which also serves as a diaphragm blade, is positioned on a base plate 114 in the rear of the lens barrel 115, the shutter 113 being operated by an exposure control device of a known type.

In the rear of the shutter 113 and the base plate 114, a converter lens attached to a movable frame 110 is positioned. This converter lens is a convex lens consisting of lenses 111 and 112 and constitutes a wide converter. This converter lens is inserted behind the photographic lens only when a short focus photographing is made.

FIGS. 2(a) and 2(b) as well as FIGS. 3(a) and 3(b) show a driving mechanism for driving the movable frame 124 of the movable mirror 109 and the movable frame 110 of the converter lens.

As shown in FIGS. 2(a) and 2(b), a shaft 110a of the movable frame 110 is aligned on the same line as that of a shaft 122a of a sector gear 122, so that the movable frame 110 and the sector gear 122 rotate around a common axle line. The movable frame 110 has a short arm 110b at a portion thereof separate from a portion at which the lenses 111 and 112 are attached, a spring 123 being placed around this arm 110b in bias the movable frame 110 to the clockwise direction in the drawings. A pin 122c, which engages with the movable frame 110, is protrudingly provided on a surface of the sector gear 122.

A sector gear 120 having teeth 120b which mesh with the teeth 122b of the sector gear 122 is rotatable around a shaft 120a, and the movable frame 124 is so positioned that its shaft 124a is aligned on a same line as that of the shaft 120a of the sector gear 120. A spring 121 is placed around the movable frame 124 to bias this movable frame 124 in the clockwise direction in the drawing. A pin 120c, which engages with the movable frame 124, is protrudingly provided on a surface of the sector gear 120, so that when the sector gear 120 is rotated in the counterclockwise direction in the drawing, the sector gear 120 and the movable frame 124 rotate integrally through this pin 120c, around the shaft 120a.

FIGS. 3(a) and 3(b) show an outline of a driving mechanism to drive the sector gear 120. In these drawings, 201 is a motor, 202 is a sun gear having a shaft 202a driven by the motor 201, and what is shown as 204 is an arm fixed at the shaft 202a, while 203 is a planetary gear rotatably supported at a position near a fore end of an arm 204, then 204a and 204b are fingers formed at the fore end of the arm 204. What is shown as 205 is a fork driving gear to transmit driving force to a fork (not shown) when it meshes with the planetary gear 203, and what is shown as 206 is a spool driving gear to transmit driving force to the spool 102 when it meshes with the planetary gear 203.

On the other hand, a pin 120e, protruding out of an outer circumference of the sector gear 120, is provided at the sector gear 120, and a toggle spring 208 of a known type is checked against a pin 209 protrudingly provided at a structural member of the camera and the pin 120e. The toggle spring 208 is a spring to perform such function that, as known well, when external force is given thereto to deform it from a certain first stable state, a resistance force (a positive resistance force) against the external force will be generated to a certain state, but when this certain state is exceeded, suddenly a negative resistance force (that is resistance force in a same direction as that of the external force) will be generated and a second stable state will be reached, a state at which the resistance force is converted from the positive to the negative being called a dead point. In the state of FIG. 3(a), the toggle spring 208 biases the sector gear 120 in the counterclockwise direction to have it contact a stopper 211 and, at the same time, blocks the sector gear 120 from rotating the clockwise direction, but under the state of FIG. 3(b) the toggle spring 208 biases the sector gear 120 in the clockwise direction to have the sector gear 120 pressure contact with another stopper 210.

A short arm 120d protruding in a direction reverse to that of the sector gear 120 itself is provided on the shaft 120a of the sector gear 120 in a manner integral with the shaft 120a, and the fore end of this arm 120d comes into a space between the fore end fingers 204a and 204b of the arm 204 of the planetary gear mechanism so that it can engage with either one of the both fingers 204a or 204b.

Next, an operation of the movable mirror 109 and the converter lenses 111 and 112 in the camera of this embodiment having a structure as mentioned above, shall be explained in relation with an operation of the camera.

First, explanations shall be made on a case when a camera operator operates an operating member of the camera to change over the camera from a long focus photographing to a short focus photographing. When an electric instruction to change over the camera from a long focus photographing to a short focus photographing is produced from an information processing circuit (not shown) within the camera, a view finder (not shown) is changed over by a mechanism (not shown) and, at the same time, a switch (not shown) for a short focus photographing is thrown in and the motor 201 is rotated in the clockwise direction under the state of FIG. 3(b). Therefore, the sun gear 202 and the arm 204 are also rotated in the clockwise direction, and thus, the planetary gear 203 is separated from the fork driving gear 205 which has been meshing with the planetary gear 203. Also the arm 204 lowers in FIG. 3(b). As the arm 204 lowers the fingers 204a and the arm 102d of the sector gear 120 engage with each other, then the arm 120d is pushed down by the finger 204a, therefore, the sector gear 120 is rotated in the counterclockwise direction around the shaft 120a resisting the resisting force of the spring 208. When the dead point of the toggle spring 208 is exceeded, the sector gear 120 is rapidly driven in the counterclockwise direction by the force of the toggle spring 208, and the state of FIG. 3(a) is secured. Then, the sector gear 120 comes in contact with the stopper 211 and has its position defined.

When the sector gear 120 is rotated in the counterclockwise direction as mentioned above, the pin 120e, which is protrudingly provided at the sector gear 120, is also rotated in the counterclockwise direction. Therefore the movable frame 124 of the movable mirror 109 is rotated in the counterclockwise direction around its shaft 124 a through the pin 120c, together with the sector gear 120. When the gear 120 comes in contact with the stopper 211 and stops, the movable frame 124 stops at the state of FIG. 1(a) and of FIG. 2(a), and the opening 101c for the movable mirror 109 of the camera body 101 is filled up with the movable mirror 109, and on the other hand, the aperture 101d for a short focus photographing and the aperture 101e for a long focus photographing will be completely separated from each other by the movable mirror 109.

On the other hand, when the secotr gear 120 rotates from the state shown in FIG. 3(b) to the state shown in FIG. 3(a) in the counterclockwise direction as mentioned above, the sector gear 122, which has been in the state shown in FIG. 2(b), rotates in the clockwise direction around its own shaft 122a. Therefore the movable frame 110 connected with the sector gear 122, by the force of the spring 123, is rotated around its own shaft 110a in the clockwise direction and finally reaches the state of FIG. 2(a). Therefore, the converter lenses 111 and 112, which are attached to the movable frame 110, are changed over, along with such movement of the movable frame 110, from the state shown in FIG. 1(b) and FIG. 2(b) to the state shown in FIG. 1(a) and FIG. 2(a) (that is a short focus photographing state), and the converter lenses 111 and 112 have their positions defined behind the lenses 116 to 118.

On the other hand, when the arm 204 lowers as mentioned above and the planetary gear 203 meshes with the spool driving gear 206, the rotation of the motor 201 is transmitted to the spool driving gear 206 through the sun gear 202 and the planetary gear 203, therefore the spool 102 is rotated and the film is taken out from the film spool and has its position defined at the aperture 1g for a short focus photographing.

A photographing can be made after preparations for a short focus photographing have been made as mentioned above.

A change-over from the short focus photographing to the long focus photographing is done by an operation reverse to what is mentioned above. That is, when the motor 201 rotates in the counterclockwise direction under the state of FIG. 3(a) by an instruction from the information processing circuit or by operating a manual button, etc., the arm 204 of the planetary gear mechanism rotates in the counterclockwise direction under the state of FIG. 3(a) around the shaft 202a, and the finger 204b engages with the arm 120d of the sector gear 120 and roatates the sector gear 120 through the arm 120d in the clockwise direction. Therefore, the movable frame 124, which has been connected with the sector gear 120 by the force of the spring 121, also rotates around its shaft 124a in the clockwise direction, thus the movable frame 124 and the movable mirror 109 shift from the state shown in FIG. 1(a) to the state shown in FIG. 1(b) and of FIG. 2(b). Also, since the sector gear 122 is driven around its shaft 122a in the counterclockwise direction, the movable frame 110 which has been connected with the sector gear 122 by the force of the spring 123 is rotated around its shaft 110a in the counterclockwise direction and is shifted finally to the state of FIG. 1(b) and of FIG. 2(b).

When the movable frame 124 reaches the state of FIG. 1(b), the frame body part 124B (FIG. 4) at the fore end of the movable frame 124 comes in an almost horizontal posture, and the frame member 124d, that is the light shielding member 124d, and the opening 124b have their positions defined in an almost horizontal posture behind the photographic lens. Since the frame member 124d is placed at a position near the movable mirror opening 101c of the camera body 101, the bundle A of light impinging obliquely into the taking lens is blocked by the frame member 124d, thus this non-effective bundle of light A will not impinge into the aperture 101e for long focus photographing.

At the same time, the movable frame 124 moves from the state shown in FIG. 1(a) to the state shown in FIG. 1(b), the movable frame 110 also moves from the state of FIG. 1(a) to the state shown in FIG. 1(b). Therefore when a long focus photographing is made, the converter lenses 111 and 112 are moved outside of the optical path (behind the movable mirror 109), and the bundle of light from an object passes through a Z shaped optical path going through the taking lenses 116 to 118, the opening 124b of the movable frame 124, the movable mirror 109 and the fixed mirror 108 and reaches the aperture 101e for long focus photographing, and, as a result, a long focus photographing can be made. In this case, in a camera according to the present invention, the both side edges of the light shielding mask 119 with a frame shape attached at the fore end plane of the lens barrel 115 is projecting out in such manner as covering up both side edges of the lens 118 as shown in FIG. 5. Therefore the effective bundle of light passing through the taking lenses 116 to 118 will be limited to that within an angular range $\theta$ shown in FIG. 1(b). The proceeding of the non-effective bundle of light, which tends to reach the aperture 101e for long focus photographing without going through the movable mirror 109, can be reduced also at the taking lens, and as a result, along with the use of the frame member 124d, which constitutes a light shielding member for the non-effective bundle of light, the proceeding of the non-effective bundle of light, which tends to reach the aperture for long focus photograping without going through a proper optical path when a long focus photographing is made, can be completely blocked.

As has been explained above, a camera according to the present invention has such arrangement that a photographic lens is used as a lens for a long focus photographing, and when a long focus photographing is made, the proceeding of the non-effective bundle of light into the aperture for long focus photographing is blocked by the light shielding mask 119 at a fore end of the lens barrel and the frame member (light shielding member) 124d behind the photographic lens, and, on the other hand, when a short focus photographing is made, the convex type converter lens as a wide converter, which is associated with the movable mirror 109 is inserted behind the photographic lens. Therefore, a necessity of providing such a front lens as in a camera which has been already proposed is eliminated, and, as a result, a variable power camera which is thin and has a light weight and a good portable characteristic yet can be manufactured at a low cost can be realized.

Now, in the above-mentioned embodiment, those components the same as what has been disclosed in the above-mentioned U.S. application Ser. No. 866,328 which the present inventor has already filed are not explained wherever possible.

As has been mentioned above, according to the present invention, a camera which has the following effects is provided:

(a) As it is not necessary to provide a shiftable front lens, a camera can be made to move a thin shape and its portable characteristic is improved.

(b) As a large size associating mechanism to move the front lens, the movable mirror, and a view finder mechanism associated among them is not needed, a weight of a camera can be reduced and, at the same time, its manufacturing cost can be reduced.

(c) Since the light shielding member 124d for shielding the non-effective bundle of light when a long focus photographing is formed integrally with the movable mirror supporting frame 124, a complicated associating mechanism for the light shielding member is not needed, therefore, a size of the camera can be prevented from becoming larger and, at the same time, an increase in the manufacturing cost can also be prevented. Further, the movable zone of the converter lenses 111 and 112 and the movable zone of the movable mirror 109 are made to overlap with each other, therefore an increase in size of the camera as the converter lens is made movable can be prevented.

What is claimed is:

1. A magnification change-over devide for a camera, comprising:
    (a) a common incident optical path for having rays of light from an object impinge thereinto;
    (b) a first optical path for guiding said rays of light from the object, impinging into said common incident optical path, to a first aperture;
    (c) a second optical path for guiding said rays of light from the object, impinging into said common incident optical path, to a second aperture;
    (d) selection means for selecting either said first aperture or said second aperture, said selection means prohibiting incidence of said rays of light from the object onto the aperture which is not selected by said selection means; and
    (e) a wide converter for rendering a magnification of an image formed at said first apertue different from a magnification of an image formed at said second aperture.

2. A device according to claim 1, further comprising a photographing optical system positioned in said common incident optical path.

3. A device according to claim 2, wherein said wide converter is provided in the rear of said photographing optical system.

4. A device according to claim 3, wherein said wide converter includes variable means for changing over a state for guiding the rays of light from the object to the first aperture and a state for not guiding said ray of light to the first aperture.

5. A device according to claim 4, wherein said variable means includes associating means for an association with said selection means.

6. A device according to claim 5, wherein said selection means includes reflection means for changing a proceeding direction of the rays of light from the object.

7. A device according to claim 6, wherein said associating means arranges the associating relationship in such manner that said reflection means and said wide converter will not be placed in an opening state simultaneously.

8. A device according to claim 1, further comprising means for cutting off rays of light for preventing the rays of light from object from impinging into the one of said first and second apertures which has not been selected by said selection means.

9. A device according to claim 8, wherein said means for cutting off rays of light is provided integrally with said selection means.

10. A device according to claim 8, wherein said means for cutting off rays of light is provided integrally with said photographing optical system.

11. A device according to claim 8, further comprising a housing part for housing said selection means, said housing part having said rays of light cutting off means integrally provided therewith.

12. A device according to claim 1, wherein said common incident optical path consists of a single optical path.

13. A device according to claim 1, wherein said first optical path and said second optical path are made to have different optical path lengths from each other.

14. A device according to claim 1, which further comprises a motor for driving said selection means.

15. A magnification change-over device for a camera, comprising:
(a) a common indicent optical path for having rays of light from an object impinge thereinto;
(b) a first optical path for guiding said rays of light from the object, impinging into said common incident optical path, to a first aperture;
(c) a second optical path for guiding said rays of light from the object, impinging into said common incident optical path, to a second aperture;
(d) selection means for optically selecting either said first optical path or said second optical path;
said selection means prohibiting function of the optical path which is not selected by said selection means; and
(e) a wide converter for rendering a magnification of an image formed at said first aperture different from a magnification of an image formed at said second aperture.

16. A camera, comprising:
(a) a common incident optical path for having rays of light from an object impinge thereinto;
(b) a first optical path for guiding said rays of light from the object, impinging into said common incident optical path, to a first aperture;
(c) a second optical path for guiding said rays of light from the object, impinging into said common incident optical path, to a second aperture;
(d) selection means for selecting either said first aperture or said second aperture, said selection means prohibiting incidence of said rays of light from the object onto the aperture which is not selected by said selection means; and
(e) a wide converter for rendering a magnification of an image formed at said first aperture different from a magnification of an image formed at said second aperture.

17. A camera according to claim 16, further comprising a photographing optical system positioned in said common incident optical path.

18. A camera according to claim 17, wherein said wide converter is provided in the rear of said photographing optical system.

19. A camera according to claim 18, wherein said wide converter includes variable means for changing over a state for guiding the rays of light from the object to the first aperture and a state for not guiding said rays of light to the first aperture.

20. A camera according to camera 19, wherein said variable means includes associating means for an association with said selection means.

21. A camera according to claim 20, wherein said selection means includes reflection means for changing a proceeding direction of the rays of light from the object.

22. A camera according to claim 21, wherein said associating means arranges the associating relationship in such manner that said reflection means and said wide converter will not be placed in an operating state simultaneously.

23. A camera according to claim 16, further comprising means for cutting off rays of light for preventing the rays of light from an object for impinging into the one of said first and second apertures which has not been selected by said selection means.

24. A camera according to claim 23, wherein said means for cutting off rays of light is provided integrally with said selection means.

25. A camera according to claim 23, wherein said means for cutting off rays of light is provided integrally with said photographing optical system.

26. A camera according to claim 23, further comprising a housing part for housing said selection means, said housing part having said rays of light cutting off means integrally provided therewith.

27. A camera according to claim 16, wherein said common incident optical path consists of a single optical path.

28. A camera according to claim 16, wherein said first optical path and said second optical path are made to have different optical path lengths from each other.

29. A device according to claim 16, which further comprises a motor for driving said selection means.

30. A camera, comprising:
(a) a common incident optical path for having rays of light from an object impinging thereinto;
(b) a first optical path for guiding said rays of light from the object, impinging into said common incident optical path, to a first aperture;
(c) a second optical path for guiding said rays of light from the object, impinging into said common incident optical path, to a second aperture;
(d) selection means for optically selecting either said first optical path or said second optical path;
said selection means prohibiting function of the optical path which is not selected by said selection means; and
(e) a wide converter for rendering a magnification of an image formed at said first aperture different from a magnification of an image formed at said second aperture.

* * * * *